United States Patent [19]

van der Aa

[11] Patent Number: 4,699,360

[45] Date of Patent: Oct. 13, 1987

[54] AUTOMATIC THREE-SPEED WINCH

[75] Inventor: Leonardus J. van der Aa, Asten, Netherlands

[73] Assignee: Enkes Marine B.V., Asten, Netherlands

[21] Appl. No.: 14,123

[22] Filed: Feb. 2, 1987

Related U.S. Application Data

[63] Continuation of Ser. No. 723,941, Apr. 16, 1985, abandoned.

[30] Foreign Application Priority Data

Apr. 16, 1984 [NL] Netherlands ........................ 8401223

[51] Int. Cl.[4] ........................... F16H 5/72; B66D 1/30

[52] U.S. Cl. ....................................... 254/345; 74/812; 254/354; 254/355; 254/357

[58] Field of Search ............... 254/274, 298, 309, 310, 254/345, 354, 355, 357; 74/812

[56] References Cited

U.S. PATENT DOCUMENTS

| | | | |
|---|---|---|---|
| 3,145,974 | 8/1964 | Short | 254/323 |
| 3,599,937 | 8/1971 | Carter | 254/342 X |
| 3,670,589 | 6/1972 | Carter | 254/344 X |
| 3,927,580 | 12/1975 | Fawcett | 74/812 |
| 3,931,958 | 1/1976 | Hobbs | 254/355 |
| 3,962,935 | 6/1976 | Hutton et al. | 254/344 X |
| 3,973,755 | 8/1976 | Fawcett | 254/354 |
| 4,054,266 | 10/1977 | Guangorena | 254/354 X |
| 4,111,397 | 9/1978 | Bonassi | 254/345 |

FOREIGN PATENT DOCUMENTS

| | | | |
|---|---|---|---|
| 7611872 | 6/1977 | Netherlands | 254/342 |
| 1368739 | 10/1974 | United Kingdom | 254/342 |
| 2001596 | 2/1979 | United Kingdom | 254/346 |

*Primary Examiner*—Stuart S. Levy

*Assistant Examiner*—Joseph J. Hail, III

*Attorney, Agent, or Firm*—Weingarten, Schurgin, Gagnebin & Hayes

[57] ABSTRACT

An automatic three-speed winch comprising a base plate (1), a bollard (2) mounted for rotation relative to said base plate and carrying teeth (7) on its inner surface, arranged to cooperate through intermediate gears, with at least one driving gear (5, 6) around a central shaft (14) of the winch. An element (21, 22) is provided, which is mounted for rotation between a first and a second position about the central shaft (4) of the winch, which element carries three shafts (12, 14, 20), with a pair of gears (8, 11; 18, 19; 10, 13) being mounted for rotation about each shaft. The transition between the three different speeds takes place fully automatically by just changing the direction of rotation of the driving gear, without requiring any further operation on the winch.

6 Claims, 4 Drawing Figures

AUTOMATIC THREE-SPEED WINCH

This application is a continuation of application Ser. No. 723,941, filed Apr. 16, 1985 now abandoned.

FIELD OF THE INVENTION

This invention relates to a three-speed winch comprising a base plate, a bollard mounted for rotation relative to said base plate and carrying teeth on its inner surface, arranged to engage with at least one gear wheel coupled with at least one driving gear around a central shaft of the winch.

BACKGROUND OF THE INVENTION

Such winches are well-known and specifically are used on a large scale in yachting, for winding a sheet on the bollard, which takes place either manually by means of a crank which can be placed in an appropriate hole in the vicinity of the upper surface of the bollard, and by means of which the driving gear can be rotated, or automatically by means of a motor coupled to the driving gear. As the hauling of a sheet by means of the winch requires very substantial forces, the prior art has developed winches arranged to rotate at different speeds, so that, at a first speed, one revolution of the driving gear corresponds to the largest displacement of the sheet by means of the winch, and each next speed corresponds to a shorter displacement of the sheet, so that the force required for tautening the sheet decreases with subsequent winch speeds. In the case of a two-speed winch, the arrangement is generally such that when the driving gear is rotated in a first direction the bollard rotates at the first speed, and when the direction of rotation of the driving gear is reversed, the bollard rotates at the second speed.

In prior art three-speed winches, the transition between successive speeds is also effected by reversing the direction of rotation of the driving gear, but at some moment during use at successive speeds, it is necessary to manually operate a lever, a button, or the like, for the winch to be successively operated at the three speeds.

Operating a button, lever, or the like, however, is an additional operation which, for example during racing, but also in the case of heavy weather, may be highly undesirable, because it tends to distract the yachtman's attention, who would, in addition, in many cases like to have the hand required for turning the button or the like free either to rotate the winch cranks with both hands, or for other work. Accordingly, there is a great need of a three-speed winch in which the transition between the different speeds is effected fully automatically just by changing the direction of rotation of the driving gear, without the need of operating the winch in any other way.

SUMMARY OF THE INVENTION

It is an object of the present invention to provide such a fully automatic three-speed winch.

For this purpose the present invention provides an automatic three-speed winch of the kind defined above, which is characterized by a first and a second driving gear fixedly mounted on the central shaft, a first pair of gear wheels mounted for rotation around a common shaft fixedly connected to the base plate, the first gear wheel of the pair meshing with the teeth of the bollard, and by an element mounted on the central winch shaft for rotation between a first and a second position, said element carrying three shafts each mounting a pair of gears, namely, a pair of gears around the first shaft carried by the element, the first of which meshes with the first driving gear, and the second of which meshes with the teeth of the bollard, a pair of gears around the second shaft carried by the element, the first of which meshes with the second driving gear, and the second of which meshes with the first gear of the pair of gears around the third shaft carried by said element, the second of which pair of gears meshes with the teeth of the bollard, the pairs of gears around the first and the third shaft carried by said element being provided with a pawl mechanism which couples the gears of each pair together in a first direction of rotation and permits free relative movement in the opposite direction of rotation, and wherein, in the first position of the element carrying the shafts, the first gear of the pair of gears around the first shaft carried by said element meshes with the second gear mounted around the shaft fixedly connected to the base plate, and in the second position of the element said gears are uncoupled relatively to each other.

Owing to the specific construction of the winch according to this invention, it is possible to cause it to rotate at a first speed by causing the driving gears, either manually, or automatically, to move in a first direction, and subsequently to cause the winch to move at the second speed by causing the driving gears to move in a second direction opposite to the first direction, and finally to cause the winch to rotate at the third speed by causing the driving gears to move in the first direction again. During these operations, the element carrying the three shafts with the pairs of gears occupies the first position at the first speed, and for the second and third speeds is moved into its second position automatically, that is to say, without any other operation than the reversal of the direction of rotation of the driving gears.

In a preferred embodiment of the invention, when the winch is in the condition to move at the second or third speed, and the tension of the sheet around the bollard of the winch is removed by letting go the sheet, the winch automatically returns to the condition in which it is arranged to rotate at the first speed by virtue of the provision of a resilient means which biases the element carrying the shafts to its first position. It is also possible, however, to realize this without a resilient means by manually turning the bollard a little, whereby said element is also moved into its first position.

DESCRIPTION OF THE DRAWING

One embodiment of the invention will now be described, by way of example, with reference to the accompanying drawings. In said drawings.

DETAILED DESCRIPTION OF THE INVENTION

Figure 1:
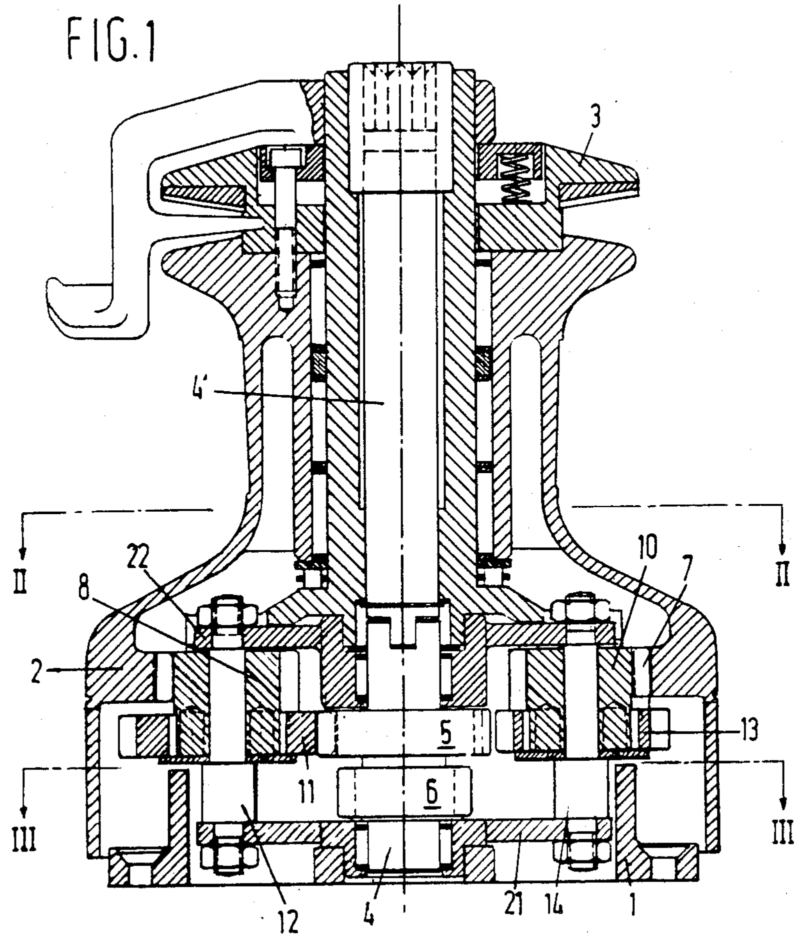
FIG. 1 shows a side view in cross-section of the winch according to the present invention, taken on the line I—I of FIG. 2.
Figure 4:
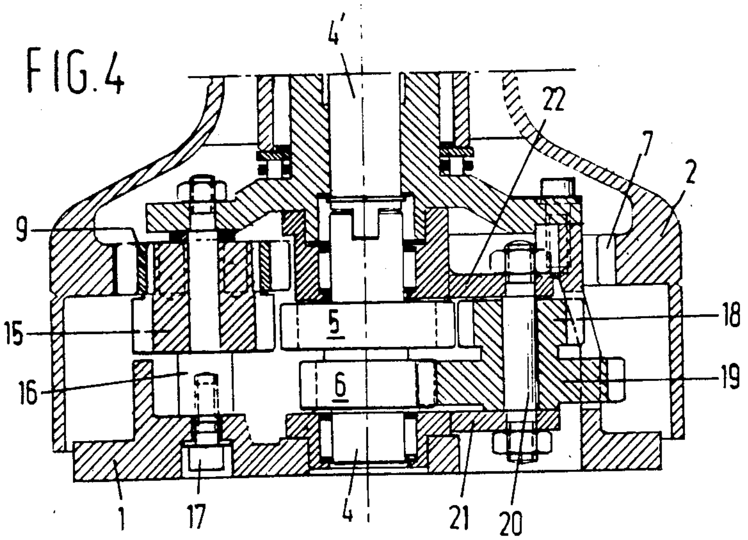
FIG. 4 shows a side view in cross-section, taken on the line IV-IV of FIG. 2.

FIGS. 1–4 show a winch according to the present invention, comprising a base plate 1, to be fixedly secured to the deck of a ship or the like, a bollard 2 mounted for rotation about the base plate 1, and provided at the top with known per se elements, fixedly connected thereto, for guiding and automatically clamping the sheet of a sail. This part for receiving the sheet is generally indicated by reference numeral 3 and will not be described further herein, these parts being known per se and not constituting part of the present invention.

Provided centrally in base plate 1 is a hole journalling a shaft 4. To simplify the assembly of the winch, shaft 4 is made up of two fixedly interconnected parts 4 and 4', with the part 4' extending up to the top of the winch, where it is provided with means arranged to cooperate with a known per se crank not shown for rotating shaft 4, 4'. In the case of a motor-driven winch, there is of course no crank, and shaft 4 is coupled in known manner to a driving motor, generally located below the base plate, i.e., below deck. Bollard 2 is also mounted for rotation around shaft 4, 4'.

Fixedly connected to shaft 4 are a first driving gear 5 and a second driving gear 6. The inner circumference of bollard 2 has a set of teeth 7 meshing with the teeth of gears 8, 9 and 10. Gear 8 is, together with a further gear 11, mounted for rotation around a shaft 12, and gear 11 is provided, in known manner, with internal teeth cooperating with a spring-loaded pawl, mounted on gear 8 in known manner, so that when, as viewed in FIG. 2, gear 11 rotates clockwise, this gear takes along gear 8 via the pawl, whereas when gear 11 rotates counter-clockwise, as viewed in FIG. 2, gear 8 is not taken along via the pawl.

Since the coupling together of two gears mounted for rotation around a shaft in such a manner that the first gear, which carries internal teeth, only takes along a second gear, which carries a pawl engaging with said interior teeth upon rotation in one direction is a well-known construction, this construction is not shown in further detail in the drawing for reasons of clarity, and will not be described further herein.

Gear 10, together with a gear 13 are mounted for rotation about a shaft 14. Gear 13 is, again, provided with interior teeth, and gear 10 with a pawl, which takes along gear 10 upon rotation of gear 13 in the clockwise direction, as viewed in FIG. 2, whereas gear 10 is not taken along upon rotation in the opposite direction.

Gear 9, together with a gear 15, are mounted for rotation about a shaft 16 which by means of, for example, a bolt 17 is fixedly connected to base plate 1. Gear 9 is preferably also provided with interior teeth, and gear 15 with a pawl, so that when gear 15 rotates in the clockwise direction, as viewed in FIG. 2, gear 9 is taken along via the pawl, whereas during rotation in the opposite direction gear 9 is disengaged. This pawl mechanism prevents twisting of the gears during transition to the second speed.

Finally there are provided a pair of fixedly interconnected gears 18 and 19 mounted for rotation about a common shaft 20.

The lower ends of the three shafts 12, 14 and 20 are carried by an element 21 which, in plan view, has three legs, the end of each leg carrying one of the shafts. Element 21 is mounted for rotation in base plate 1 centrally between shafts 12 and 14 between the wall of the central hole therein and shaft 4. A second element 22, which in plan view has essentially the same shape as element 21, carries the top ends of shafts 12, 14 and 20 and is also mounted for rotation about shaft 4. Shafts 12, 14 and 20 are fixedly connected to elements 21 and 22 by suitable means, for example nuts.

The three-legged elements 21 and 22, which via shafts 12, 14 and 20 respectively carry pairs of gears 8 and 11; 10 and 13; 18 and 19; and are mounted for rotation about the central shaft 4 of the winch, make it possible, in the manner to be described hereinafter, for the winch to successively run at the three speeds fully automatically.

Figure 3:
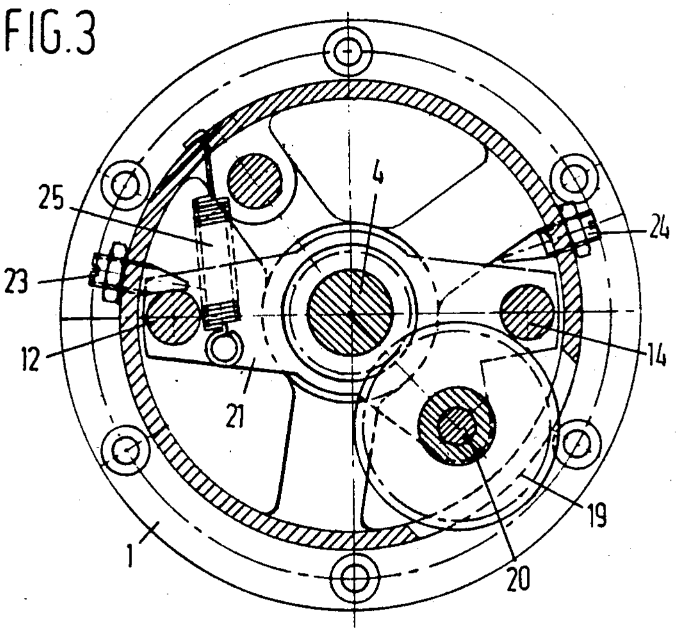
FIG. 3 shows a top plan view of the winch in cross-section, taken on the line III—III of FIG. 1.

To limit the movement of elements 21 and 22 between the first position and the second position, there are provided, as shown in FIG. 3, a first stop 23 arranged to cooperate with shaft 12 and a second stop 24 arranged to cooperate with shaft 14.

The operation of the three-speed winch according to the invention will now be described with reference to the hand-operated winch shown in the drawings. The operation of an automatic winch is quite the same, except for the hand operation, and will not therefore be described in any detail.

Figure 2:
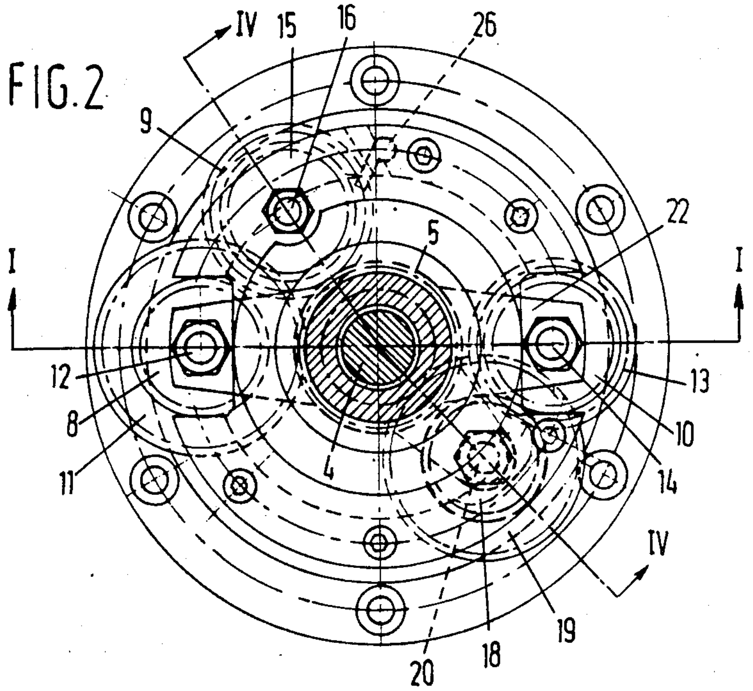
FIG. 2 shows a top plan view of the winch in cross-section on the line II—II of FIG. 1.

When no sheet is wound around the bollard, or when a sheet is wound around it which is not yet tautened, the various gears are in the position shown in FIGS. 2 and 3, with one leg of element 21 being biased by a spring 25 to its first position, and shaft 12 abutting stop 23. Stop 23 serves to limit the extent to which the teeth of gears 11 and 15 mesh at the first speed, so that these gears do not become to deeply meshed, which would greatly impede their rotation. Naturally, instead of stop 23, various other means may be provided to prevent the gears from becoming to deeply interengaged.

When, in the condition shown in FIGS. 2 and 3, which corresponds to the first speed of the winch, gears 5 and 6 are turned clockwise, as viewed in Figs. 2 and 3, by means of a crank, and via shaft 4, gear 5, which meshes with the teeth of gear 11, causes gear 11 to rotate counter-clockwise. When gear 11 turns counter-clockwise, as described above, gear 8 is disengaged, because its pawl does not engage the interior teeth of gear 11. Gear 11, which rotates counter-clockwise, meshes with the teeth of gear 15, causing it to turn clockwise. The pawl mounted on the clockwise rotating gear 15 engages the interior teeth of gear 9, which therefore also turns clockwise. The teeth of gear 9 mesh with the set of teeth 7 of bollard 2 and cause the same to turn clockwise, whereby the sheet can be tautened.

To prevent the condition that, when the crank is released during rotation of the winch at the first speed, gear 9 is turned counter-clockwise via set of teeth 7 under the influence of the force exerted on the bollard by the sheet, which would force elements 21 and 22 to their second position for the second and third speed, there is preferably provided a spring-loaded pawl 26, which only permits gear 9 to turn clockwise. By virtue of this, in the condition for the first speed the crank can be released and subsequently be turned further at any desired moment, with the winch continuing to be in the condition for the first speed.

When, during clockwise rotation of the crank at the first speed, it is noticed that the tautening of the sheet becomes too heavy, the winch can be set in the second-speed mode by turning the crank counter-clockwise, in which mode the transmission ratio between the gears is so selected that one revolution of the crank turns the bollard to a lesser extent, so that less force is required. By turning the crank counter-clockwise, elements 21 and 22, which carry shafts 12, 14 and 20, are displaced counter-clockwise, as viewed in FIGS. 2 and 3, against the action of spring 25, to the second position in which shaft 14 is in abutment with stop 24. In this connection it is noted that, instead of stop 24, other provisions are possible to limit the displacement of elements 21, 22.

Owing to the displacement of elements 21, 22, gears 11 and 15 become disengaged, so that gear 11 no longer takes along gear 15 during its rotation. As gear 5 is turned counter-clockwise via shaft 4, gear 11 now turns clockwise, so that this gear, via its interior teeth, takes along the pawl of gear 8, so that this gear turns clockwise too. The teeth of gear 8 mesh with the set of teeth 7 of the bollard, and cause the same to rotate at the second speed, which owing to a suitably selected ratio of the teeth of the various gears, is lower than the first speed.

When, during counter-clockwise rotation at the second speed, the crank is released, elements 21 and 22 automatically remain in the second position owing to the force exerted by the sheet around the bollard. If, during rotation of the winch at the second speed, the force required for tautening the sheet again becomes excessive, it is possible to change to the third speed, which as a result of a suitable choice of the teeth of the various gears is again lower than the second speed. This only requires the crank to be turned clockwise again, instead of counter-clockwise for the second speed, when gear 5 also turns clockwise. Via gear 5, gear 11 turns counter-clockwise, and gear 8 is disengaged as a result of the pawl mechanism, while gear 11 also does not engage with gear 15. Gear 6, however, which also turns clockwise via shaft 4, meshes with the teeth of gear 19, and causes the fixedly interconnected gears 18 and 19 to turn counter-clockwise. The teeth of gear 18 engage with those of gear 13, and cause gear 13 to turn clockwise, whereby the internal teeth of gear 13 engage with the pawl of gear 10 and cause the same to turn clockwise as well. The teeth of gear 10, which rotates clockwise, mesh with the interior teeth 7 of the bollard and cause the bollard to rotate at the lowest speed.

When the sheet is cast off from bollard 2, the force which the sheet exerts on gears 8 and 9 via teeth 7, by means of which elements 21 and 22 are forced into their second position, is removed, so that, under the influence of spring 25, the elements can be returned to the first position for the first speed automatically, or in the absence of a spring, manually.

It will be clear from the above that the invention provides a three-speed winch arranged to effect a change from the first to the second speed and from the second to the third speed exclusively by successively changing the direction of rotation of the crank driving the winch, without any other operation, such as the manual operation of a pawl or button, being required. This makes the operation of the winch considerably simpler than that of all hitherto known three-speed winches.

I claim:

1. An automatic three-speed winch, comprising a base plate, a bollard mounted for rotation relative to said base plate and carrying teeth on its inner surface, arranged to engage with at least one gear wheel coupled with at least one driving gear around a central shaft of the winch, characterized by a first and a second driving gear (5, 6) fixedly mounted on the central shaft (4), a first pair of gear wheels (9, 15) mounted for rotation around a common shaft (16) fixedly connected to the base plate (1), the first gear wheel (9) of this pair meshing with the teeth (7) of the bollard (2), and by a rotatably journalled element (21, 22) mounted on the central winch shaft (4) for rotation between a first and a second position, said element carrying three shafts (12, 14, 20) each mounting a pair of gears, namely, a pair of gears (8, 11) around the first shaft (12) carried by the element (21, 22), the first (11) of which meshes with the first driving gear (5), and the second (8) of which meshes with the teeth (7) of the bollard, a pair of gears (18, 19) around the second shaft (20) carried by the elements (21, 22), the first (19) of which meshes with the second driving gear (6), and the second (18) of which meshes with the first gear (13) of the pair of gears (10, 13) around the third shaft (14) carried by said element, the second (10) of which pair of gears (10, 13) meshes with the teeth (7) of the bollard, the pairs of gears (8, 11 and 10, 13) around the first and the third shaft (12 and 14) carried by said element being provided with a pawl mechanism which couples the gears of each pair together in a first direction of rotation and permits free relative movement in the opposite direction of rotation, and wherein, in the first position of the element (21, 22) carrying the shafts, the first gear (11) of the pair of gears around the first shaft (12) carried by said element meshes with the second gear (15) mounted around the shaft (16) fixedly connected to the base plate, and in the second position of the element (21, 22) said gears (11, 15) are disengaged relatively to each other, said three-speed winch further comprising a resilient element (25) to bias said rotatably journalled element to said first position.

2. A winch as claimed in claim 1, characterized in that the pair of gears (9, 15) around the shaft (16) fixedly connected to the base plate are provided with a pawl mechanism coupling the gears together in a first direction of rotation, and permitting free relative movement in the opposite direction of rotation.

3. A winch as claimed in claim 1 , characterized by the provision of a pawl element (26), biased into contact with the outer teeth of the first gear (9) around the shaft (16) that is fixedly connected with the base plate, the arrangement being such that this gear (9) is blocked by the pawl element in one direction of rotation.

4. A winch as claimed in claim 1 characterized in that the base plate (1) is provided with stops (23 and 24) which limit the rotation of the element (21, 22) to the first and the second position, respectively.

5. A winch as claimed in claim 1 characterized in that the first and the second shaft (12 and 14) are secured to the rotatable element (21, 22) so as to be symmetrically positioned relative to the central shaft (4).

6. A winch as claimed in claim 1 characterized in that the pair of gears (18, 19) around the second shaft (20) are fixedly interconnected.

* * * * *